UNITED STATES PATENT OFFICE.

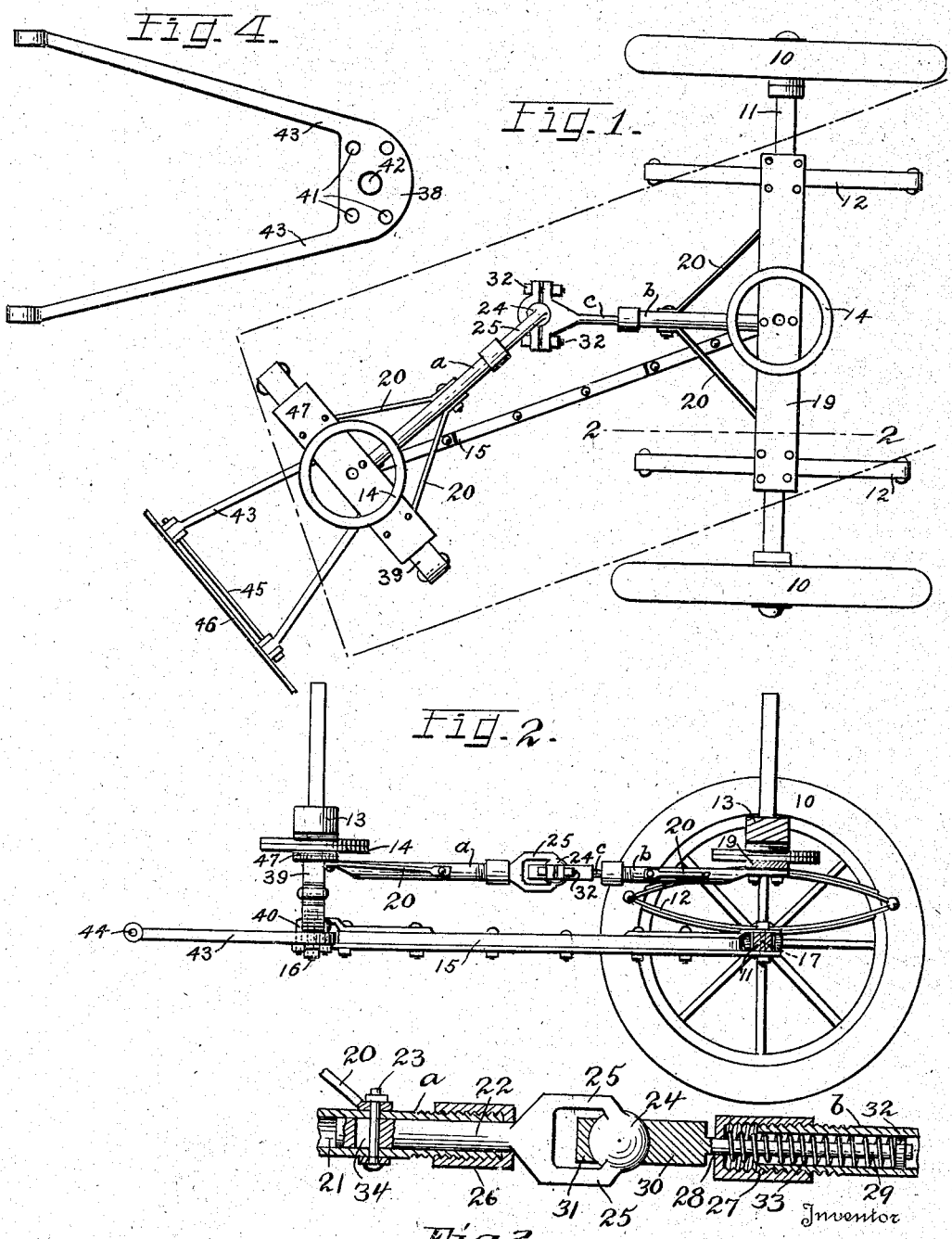

JAMES M. ROSE, OF BUFFALO, NEW YORK.

SHORT-TURNING TRUCK.

1,195,954.   Specification of Letters Patent.   Patented Aug. 22, 1916.

Application filed October 23, 1915.  Serial No. 57,610.

*To all whom it may concern:*

Be it known that I, JAMES M. ROSE, a citizen of the United States, residing at 117 Brayton street, city of Buffalo, in the county of Erie and State of New York, have invented a new and useful Short-Turning Truck, of which the following is a specification.

This invention relates to short turning trucks, and it relates more particularly to what I choose to term an automobile trailer.

The primary object of the invention is to supply the increasing demand for a combined passenger and freight motor-driven conveyance, and I attain this object by providing an improved trailer, truck or car which is suitable for the transportation of baggage (for tourists and others), or for carrying ladders, lumber and other implements and materials for contractors, tinners, plumbers, painters, and other mechanics, tradesmen and merchants.

A secondary object of the invention is to provide a vehicle of this character which will properly track in the wake of the automobile to which it is attached for propulsion, so that skidding and collisions are avoided.

A third object is to provide improved means for securing the trailer to the automobile to be employed as a tractor, so as to enable the owner to readily attach the trailer for business purposes, and to readily detach the same for utilizing the automobile solely for passenger service; so that the automobile is not rendered unfit for touring, by the service it has rendered in transporting freight.

The mechanism by which the foregoing objects and advantages are attained is illustrated in the accompanying drawings, in which similar reference characters represent similar parts throughout the several views, and in which—

Figure 1 is a top plan view of one form and embodiment of the invention, the body or bed of which is omitted, but the position that the bed would occupy being indicated by the parallel dot-and-dash lines. Fig. 2 is a view partly in side elevation and partly in longitudinal vertical section on line 2—2, Fig. 1, the body being omitted. Fig. 3 is an enlarged longitudinal sectional view through the joint and adjuncts of the upper reach. Fig. 4 is a detail plan view illustrating an improved form of connector or draft member.

In Fig. 1, the trailer or track is shown in abnormal shape, such as it assumes when drawn around a curve. The wheels 10, axles 11, springs 12 bolsters 13 and fifth-wheels 14 will not be described in detail, being of any ordinary and desirable kind. The lower reach 15 is rigid throughout its length, and is pivotally connected at 16 and 17 to the members 43 and 11 respectively. The upper reach is made in three sections, *a*, *b* and *c*. The front and rear sections *a* and *b*, respectively, are secured to the front and rear spring bars or plates 18 and 19, respectively, and are suitably braced by means of struts or brace rods 20, so that two rigid frames are formed thereby; and the section *c* forms a loose connection between these frames and between the two sections *a* and *b*. This loose connection may consist either of a ball joint, as illustrated in Figs. 1, 2, and 3, or of any other suitable modification of this principle. The connection of this middle section *c* with the end sections *a* and *b* is best illustrated in Fig. 3, which shows the section *a* as consisting of a cylinder or tube 21, a shank 22 fitted therein and secured by a bolt 23, and a ball 24 formed integrally with said shank and with two arms 25 connecting said ball with said shank. A screw-cap 26 is fitted on the end of the tube 21 so as to strengthen the latter; but instead of this particular structure, I may either form the parts 21 and 22 in one piece, or I may secure them together by other means.

The section or tube *b* is fitted with a screw-cap 27, apertured at 28, and into this tube extends the shank or plunger 29, through the aperture 28. This shank is formed integrally with the socket element 30, which latter is secured to a second socket member 31 by means of bolts 32, and these bolts secure said socket members in engagement with said ball 24, so that the latter may turn freely within the socket formed by said members. The ball and socket members form a universal joint. The plunger 29 is provided with a nut or shoulder 32 which fits snugly, but loosely, in the tube *b* and is slidable longitudinally of said tube, and a spiral or helical spring 33 is seated against said shoulder and against the inner wall of the cap 27, said spring being coiled around the plunger 29 and tending continually to draw the plunger into the tube $b$. The tension of this spring may be adjusted or regulated by screwing or unscrewing the cap 27 to the extent desired. By means of this sliding connection, the upper reach is enabled to assume the angles shown in Figs. 1 and 5, but is allowed to swing only so far that the wheels may nearly, but not quite, touch the bed of the vehicle. Besides or instead of the adjustment mentioned, I may provide any suitable means of adjusting the section $c$ with relation to the sections $a$ and $b$, such, for instance, as the slot 34 in the shank 22. By loosening the bolt 23, sliding the shank in the tube $a$ to the desired position, and then tightening the nut on the bolt 23, such adjustment may be attained.

The lower reach 15 in Figs. 1 and 2 being pivotally connected (as described) concentric with said fifth-wheels, respectively, or in the same axial center lines, it will be seen that the angle formed by the front spring and said lower reach is substantially the same as that formed by the rear axle and said reach, because the ball joint is substantially in the middle of said upper reach; that is, the leverages of these two sections $a$ and $b$ are substantially equal. It will also be seen that the jointed reach may assume the normal position, as in Fig. 2, in which position it is parallel with the rigid reach, and from this position it may be deflected to either side of the rigid reach, according to the direction of the curve around which it is to travel. The spring 33, besides tending to properly regulate the tracking of the wheels while traveling in a straight course, also prevents looseness and consequent rattling of this joint.

The combined draw member and base plate 38 shown in Fig. 4 is preferably formed in one piece, of iron or steel, though other material may be employed. On this plate is supported the front leaf-spring 39 by means of U-bolts 40 which extend through the apertures 41 and are secured therein by means of suitable nuts. The pivot bolt 16 may either extend through an aperture in the front spring, or else the pivot may be formed on or secured to the plate 38 in front or rear of the spring; in which case the aperture 42, through which this bolt or pivot extends, may be located farther forward or rearward in the plate. A pair of forwardly diverging draw-arms 43 are formed integrally with this base plate, and each of these arms is provided with an aperture 44 in its front end, so that the trailer may thereby be suitably pivotally connected to an automobile, as in Fig. 1, for instance, where 45 represents a pivot rod or bolt, and 46 represents a fragment of the automobile.

Having described these embodiments of the principles of my invention, and without limiting my invention to these particular embodiments, I claim:

1. A vehicle reach consisting of two tubular end members, a middle section pivotally connected to one of said end members and slidably connected to the other of said end members, and a spring wholly inclosed by one of said tubular end members and exerting a pressure on both of said end members.

2. A vehicle reach consisting of two end sections and an intermediate section that consists of a plunger and pivot element which latter is connected to one of said end sections, a spring surrounding said plunger and secured against movement beyond the end thereof, said plunger extending into the other of said end sections which latter also incloses said spring, and adjusting means whereby said spring is tensioned.

3. In a vehicle, the combination of a rigid reach, a front member to which said rigid reach is pivotally connected, a rear axle to which said rigid reach is pivotally connected, a pair of springs on said rear axle, a spring on said front member, an arm, means whereby said arm is connected to the first said springs, a second arm, means connecting said second arm to the second said spring, and an intermediate element slidably connected to one of said arms and pivotally connected by a universal joint to the other of said arms.

4. In a vehicle, the combination of a rear axle, a pair of springs supported thereon, a plate on said springs, a reach member rigidly connected to said plate, a rigid reach pivotally connected to said rear axle, a spring to which said rigid reach is pivotally connected, a plate on the last said spring, a reach member on the last said plate and rigid therewith, and an intermediate reach element slidably connected to one of said reach members and connected by a universal joint to the other of said reach members.

5. A jointed reach consisting of two end sections, an intermediate section having a spring-pressed connection with one of said end sections and having a pivotal connection with the other of said end sections, and means for adjusting said pivotal connection so as to compensate for wear and to prevent rattling and shocking of the several elements of the reach.

6. A jointed reach consisting of two end sections, an intermediate section having sliding connection with one of said end sections and having a universal joint connecting it with the other of said end sections, and means for preventing said universal joint from rattling.

7. A jointed reach consisting of two end sections, an intermediate section having a spring-pressed movable connection with one of said end sections and having a universal joint connecting it with the other of said end sections, and means for adjusting said universal joint so as to compensate for wear and to prevent rattling and shocking of the joint elements.

8. In a vehicle, the combination of a rigid reach, a jointed reach, a leaf spring connected to corresponding ends of said rigid and jointed reaches and extending crosswise of said reaches, a pair of leaf springs, and means connecting said pair of leaf springs to the other corresponding ends of said rigid and jointed reaches.

9. In a vehicle, the combination of a rigid reach, a jointed reach above the rigid reach, front and rear load-supporting springs one of which is at right angles to the other, and means connecting the said springs respectively to corresponding ends of said rigid and jointed reaches.

10. In a vehicle, the combination of a rigid reach, a jointed reach, a pair of load-supporting springs, means connecting said springs to corresponding ends of said reaches, an elliptic spring extending crosswise of said rigid and jointed reaches, and means connecting said elliptic spring to the other corresponding ends of said rigid and jointed reaches.

11. In a vehicle, the combination of a rigid reach, a jointed reach above the said rigid reach, a pair of load-supporting springs, means connecting said springs to corresponding ends of said reaches, an elliptic spring extending crosswise of said rigid and jointed reaches, and means connecting said elliptic spring to the other corresponding ends of said reaches.

12. In a vehicle, the combination of a rigid reach, a jointed reach, a pair of elliptic springs extending parallel with said reaches, means connecting corresponding ends of said reaches to said pair of elliptic springs, an elliptic spring extending crosswise of said reaches, and means connecting the other corresponding ends of said reaches to the last said elliptic spring.

13. In a vehicle, the combination of a rigid reach, a jointed reach, a pair of elliptic springs extending substantially parallel with said reaches, means connecting the top of each of said elliptic springs to said jointed reach, means connecting the bottom of each of said springs with said rigid reach, an elliptic spring extending crosswise of said reaches, means connecting the top of the last said elliptic spring to said jointed reach, and means connecting the bottom of the last said elliptic spring to said rigid reach.

14. In a vehicle, the combination of a front leaf spring, a pair of rear leaf springs extending at right angles to said front leaf spring, a rigid reach, elements whereby said rigid reach is movably connected to the bottom of said rear leaf springs respectively, an elastic-jointed reach, and elements whereby said elastic-jointed reach is rigidly connected to said front spring and rear springs respectively.

15. In a vehicle, the combination of a pair of rear load-supporting springs, a connecting element secured on said springs, a front load-supporting spring, a support on which said rear load-supporting springs are seated, a jointed reach connecting the front load-supporting spring with said connecting element, a lower reach connected to said support, and a combined support and draft member on which the said front load-supporting member is seated and to which the said lower reach is connected.

16. In a vehicle, the combination of a pair of rear load-supporting springs, a connecting element secured on said springs, a front load-supporting spring, a support on which said rear load-supporting springs are seated, a jointed reach connecting the front load-supporting spring with said connecting element, a lower reach connected to said support, and a piece of metal formed with a spring seat and with diverging arms constructed to be attached to a traction device and to coöperate with said traction device for supporting said front spring and being pivotally connected to said lower reach.

JAMES M. ROSE.